United States Patent
Kruglick (10) Patent No.: US 8,892,931 B2
(45) Date of Patent: Nov. 18, 2014

(54) POWER CHANNEL MONITOR FOR A MULTICORE PROCESSOR

(75) Inventor: Ezekiel John Joseph Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 260 days.

(21) Appl. No.: 12/582,301

(22) Filed: Oct. 20, 2009

(65) Prior Publication Data

US 2011/0093733 A1   Apr. 21, 2011

(51) Int. Cl.
  *G06F 1/26* (2006.01)
  *G06F 1/32* (2006.01)

(52) U.S. Cl.
  CPC ............ *G06F 1/3203* (2013.01); *G06F 1/3243* (2013.01); *Y02B 60/1239* (2013.01)
  USPC ............ 713/340; 713/300; 713/320; 714/22; 711/211; 711/E12.033

(58) Field of Classification Search
  USPC ................. 713/300, 320, 322, 323, 324, 340; 714/22; 711/211, E12.033
  See application file for complete search history.

(56) References Cited

U.S. PATENT DOCUMENTS

| | | | |
|---|---|---|---|
| 4,210,962 A | 7/1980 | Marsh et al. | |
| 4,916,659 A | 4/1990 | Persoon et al. | |
| 5,745,778 A | 4/1998 | Alfieri | |
| 5,806,059 A | 9/1998 | Tsuchida et al. | |
| 5,826,079 A | 10/1998 | Boland et al. | |
| 6,289,369 B1 | 9/2001 | Sundaresan | |
| 6,567,806 B1 | 5/2003 | Tsuchida et al. | |
| 6,658,448 B1 | 12/2003 | Stefaniak et al. | |
| 6,745,336 B1 | 6/2004 | Martonosi et al. | |
| 6,769,017 B1 | 7/2004 | Bhat et al. | |
| 6,782,410 B1 | 8/2004 | Bhagat et al. | |
| 7,143,412 B2 | 11/2006 | Koenen | |
| 7,146,607 B2 | 12/2006 | Nair et al. | |
| 7,363,523 B2 | 4/2008 | Kurts et al. | |

(Continued)

FOREIGN PATENT DOCUMENTS

| EP | 1 736 851 A2 | 12/2006 |
|---|---|---|
| JP | H08315598 A | 11/1996 |

(Continued)

OTHER PUBLICATIONS

Brooks et al., "Dynamic Thermal Management for High-Performance Microprocessors" Jan. 2001, Proceedings of the 7th International Symposium on High Performance Computer Architecture, 12 pages.

(Continued)

*Primary Examiner* — Michael J Brown
(74) *Attorney, Agent, or Firm* — Hope Baldauff, LLC (57) ABSTRACT

Technologies are generally described for power channel monitoring in multicore processors. A power management system can be configured to monitor the power channels supplying individual cores within a multicore processor. A power channel monitor can provide a direct measurement of power consumption for each core. The power consumption of individual cores can indicate which cores are encountering higher or lower usage. The usage determination can be made without sending any data messages to, or from, the cores being measured. The determined usage load being serviced by each processor core may be used to adjust power and/or clock signals supplied to the cores.

19 Claims, 6 Drawing Sheets

(56) References Cited

U.S. PATENT DOCUMENTS

| | | |
|---|---|---|
| 7,383,396 B2 | 6/2008 | Wyman |
| 7,437,581 B2 | 10/2008 | Grochowski et al. |
| 7,574,567 B2 | 8/2009 | Wyman |
| 8,051,418 B1 | 11/2011 | Dice |
| 8,078,832 B1 | 12/2011 | Agarwal et al. |
| 8,108,843 B2 | 1/2012 | Nair et al. |
| 8,181,169 B2 | 5/2012 | Nakaike et al. |
| 8,214,817 B2 | 7/2012 | Mendelson et al. |
| 8,443,341 B2 | 5/2013 | Berg et al. |
| 2003/0171907 A1 | 9/2003 | Gal-On et al. |
| 2003/0236919 A1 | 12/2003 | Johnson et al. |
| 2004/0181730 A1* | 9/2004 | Monfared et al. ............ 714/745 |
| 2005/0154861 A1 | 7/2005 | Arimilli et al. |
| 2005/0210472 A1 | 9/2005 | Accapadi et al. |
| 2005/0246461 A1 | 11/2005 | Accapadi et al. |
| 2006/0041599 A1 | 2/2006 | Tsuchida et al. |
| 2006/0225074 A1 | 10/2006 | Vaid et al. |
| 2006/0259800 A1 | 11/2006 | Maejima |
| 2007/0027972 A1 | 2/2007 | Agrawal et al. |
| 2007/0044084 A1 | 2/2007 | Wang et al. |
| 2007/0079308 A1 | 4/2007 | Chiaramonte et al. |
| 2007/0124457 A1 | 5/2007 | May et al. |
| 2008/0046895 A1 | 2/2008 | Dillenberger et al. |
| 2008/0126751 A1 | 5/2008 | Mizrachi et al. |
| 2008/0178183 A1 | 7/2008 | Accapadi et al. |
| 2008/0181283 A1* | 7/2008 | Elhanati et al. ............... 375/130 |
| 2008/0229127 A1* | 9/2008 | Felter et al. ................... 713/320 |
| 2009/0031317 A1 | 1/2009 | Gopalan et al. |
| 2009/0031318 A1 | 1/2009 | Gopalan et al. |
| 2009/0070553 A1 | 3/2009 | Wallach et al. |
| 2009/0077562 A1 | 3/2009 | Sen et al. |
| 2009/0125894 A1 | 5/2009 | Nair et al. |
| 2009/0126006 A1 | 5/2009 | Zhang et al. |
| 2009/0187915 A1 | 7/2009 | Chew et al. |
| 2010/0017804 A1 | 1/2010 | Gupta et al. |
| 2010/0122101 A1* | 5/2010 | Naffziger et al. ............. 713/340 |
| 2010/0191854 A1 | 7/2010 | Isci et al. |
| 2010/0225496 A1* | 9/2010 | Hou et al. ................... 340/636.1 |
| 2011/0004692 A1 | 1/2011 | Occhino et al. |
| 2011/0088021 A1 | 4/2011 | Kruglick |
| 2011/0088022 A1 | 4/2011 | Kruglick |
| 2011/0088038 A1 | 4/2011 | Kruglick |
| 2011/0088041 A1 | 4/2011 | Alameldeen et al. |
| 2011/0302585 A1 | 12/2011 | Dice |

FOREIGN PATENT DOCUMENTS

| | | | |
|---|---|---|---|
| JP | 2005085164 | A | 3/2005 |
| JP | 2006318380 | A | 11/2006 |
| JP | 2008513912 | A | 5/2008 |
| JP | 2008306522 | | 12/2008 |

OTHER PUBLICATIONS

Donald et al., "Techniques for Multicore Thermal Management: Classification and New Exploration". Jun. 2006, Proceedings of the 33rd Annual International Symposium on Computer Architecture, pp. 78-88.

Kang et al., "Preliminary Study toward Intelligent Run-time Resource Management Techniques for Large Multi-Core Architectures," Apr. 15, 2008, University of Southern California—Information Sciences Institute, 2 pages.

Shirako et al., "Compiler Control Power Saving Scheme for Multi Core Processors" In *Lecture Notes in Computer Science: Languages and Compilers for Parallel Computing*. vol. 4339/2006. Springer-Verlag, Berlin, pp. 362-376, 2007.

International Search Report dated Feb. 3, 2011 in International Application No. PCT/US2010/053110.

"P6T New Era for Ultimate Performance! Intel® Core™ i7 Platform," accessed at http://www.asus.com/Motherboards/Intel_Socket_1366/P6T/, accessed on Mar. 5, 2012, pp. 4.

U.S. Office Action dated Jan. 31, 2012 in U.S. Appl. No. 12/578,321.
U.S. Office Action dated Jul. 5, 2012 in U.S. Appl. No. 12/578,321.
U.S. Office Action dated Jun. 6, 2012 in U.S. Appl. No. 12/578,295.
U.S. Office Action dated Jun. 21, 2012 in U.S. Appl. No. 12/578,336.

Albonesi, D., "Selective Cache Ways: On-Demand Cache Resource Allocation," Nov. 1999, Proceedings of the International Symposium on Microarchitecture, 12 pages.

Bala, et al., "Dynamo: A Transparent Dynamic Optimization System," Jun. 2000, Proceedings of Programming Language Design and Implementation, 12 pages.

Baraz, et al., "IA_32 Execution Layer: A Two-Phase Dynamic Translator Designed to Support IA-32 Application on Itanium®-based Systems," Dec. 2003, Proceedings of the 36th International Symposium on Microarchitecture, 11 pages.

Dehnert, et al., "The Transmeta Code Morphing™ Software: Using Speculation, Recovery, and Adaptive Retranslation to Address Real-Life Challenges," 2003, ACM International Conference Proceedings Series, vol. 37, Proceedings of the International Symposium on Code Generation and Optimization: Feedback-directed and Runtime Optimization, Abstract, 9 pages.

Ebcioglu, et al., "DAISY: Dynamic Compilation for 100% Architectural Compatibility," 1997, Proceedings of the 24th International Symposium on Computer Architecture, 13 pages.

Song, et al., "Feedback-Directed Thread Scheduling with Memory Considerations," ACM, Jun. 2007, pp. 1-10.

Microsoft .NET Framework, http://www.microsoft.com/net/, accessed Oct. 13, 2009, 1 page.

Song, et al., "Analytical Modeling and Optimization for Affinity Based Tread Scheduling on Multicore Systems", Jul. 14, 2009, IEEE Cluster 2009, New Orleans, Louisiana, 10 pages.

Japanese Office Action dated Sep. 3, 2013.
U.S. Office Action dated Nov. 21, 2012 in U.S. Appl. No. 12/578,295.
U.S. Office Action dated Nov. 21, 2012 in U.S. Appl. No. 12/578,336.
U.S. Official Action dated Sep. 5, 2013 in U.S. Appl. No. 12/578,321.
U.S. Notice of Allowance dated Sep. 17, 2013 in U.S. Appl. No. 12/578,336.

Simon, CS 267: Applications of Parallel Computers Lecture 17: Parallel Sparse Matrix-Vector Multiplication; pp. 66; Oct. 22, 2002. http://www.cs.berkeley.edu/~strive/cs267.

Filch et al., On the Potential of NOC Virtualization for Multicore Chips; Scalable Computing: Practice and Experience; vol. 9, No. 3, pp. 165-177 http://www.scpe.org; 2008.

U.S. Official Action dated Jan. 28, 2014 in U.S. Appl. No. 12/578,321.

\* cited by examiner

POWER CHANNEL MONITOR FOR A MULTICORE PROCESSOR

BACKGROUND

Unless otherwise indicated herein, the materials described in this section are not prior art to the claims in this application and are not admitted to be prior art by inclusion in this section.

Multicore processors are generally made up of multiple processor cores with interconnections between the individual cores. Some architectures for interconnecting individual cores support communication between neighboring cores with high efficiency. However, communications between nonadjacent cores within the multicore processor may incur delays due to passing messages between intermediate cores. As core counts within multicore processors increase, optimization of communication between cores becomes increasingly important. These communications may include messages querying the level load on the different cores within the multicore processor.

Dynamic voltage and frequency scaling (DVFS) is a power management technique where voltages and/or clock frequencies associated with a processor are adjusted to manage heat generation and power consumption. Dynamic voltage scaling can decrease the voltage applied to a processor in order to conserve power. This may be particularly useful in laptop computers and other types of battery powered mobile devices. Dynamic voltage scaling can increase the voltage applied to a processor in order to increase computer performance. Dynamic frequency scaling can decrease, or even pause, the clock frequency of the processor in order to decrease power consumption.

Attempts to apply DVFS to individual cores within a multicore processor may encounter a number of difficulties as the number of cores increases. For example, obtaining steady and up-to-date information on the computation load or power required by each core through message queries to the cores can scale into a performance limitation for the multicore processor.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein.

This disclosure is generally drawn, inter alia, to methods, apparatus, and systems related to power channel monitoring in multicore processors. Techniques are described for a power management system that can be configured to monitor the power channels supplying individual cores within a multicore processor. The system may include a power monitor that provides a direct measurement of power consumption for each core. The power consumption of individual cores can indicate which cores are encountering higher or lower usage. The usage determination can be made without sending any data messages to, or from, the cores being measured. The determined usage load being serviced by each processor core may be used to adjust power and/or clock signals supplied to the cores. Reducing data communications between cores can improve system operation, particularly as the number of cores increases. Furthermore, determining usage without data communications may also reduce processor computation cycles associated with traditional usage measurements such as operation counting.

Power monitoring in the manner presented herein can measure power consumed by processor cores within a multicore processor. The measured power and other power management information may be provided to a power manager module. The power manager module may be configured to adjust one or more operational parameters of the processor cores based upon the measured power. In some example scenarios, the power manager module may adjust the current, voltage, power, clock signals, or any combination thereof provided to the corresponding processor cores. Example clock signal characteristics that can be adjusted may include a clock signal amplitude, frequency, voltage, pulse width, period, or duty cycle. Also, the power manager module may be configured to indirectly adjust the use of, or task allocation to, each of the processor cores by providing power consumption and usage information to a higher level power management operation.

Power monitoring in the manner presented herein can also provide more accurate processor core usage measurements than traditional temperature monitoring since temperature monitoring may be affected by the environment, the operation of neighboring cores, or other blocks within the integrated circuit supporting the processor. Power monitoring can be used with dynamic voltage and frequency scaling (DVFS) since the scaled voltages or switching frequencies will manifest as reduced monitored power consumption. According to some embodiments, power monitoring may also serve as a watchdog monitor to identify when a processor core is locked in an infinite loop or some other error state. These states can often be associated with consistently high power consumption by an affected processor core.

Figure 1:
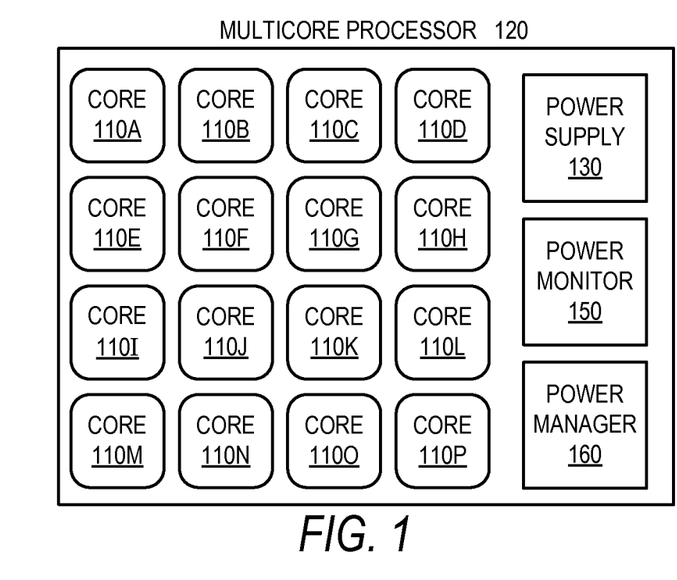
FIG. 1 is a block diagram illustrating a multicore processor configured for power channel monitoring.

FIG. 1 is a block diagram illustrating a multicore processor 120 configured for power channel monitoring according to one or more embodiments presented herein. The multicore processor 120 may comprise multiple cores 110A-110P. The multiple cores 110A-110P may be referred to collectively, or in general, as cores 110. A power supply 130 (e.g., a power supply circuit, a power supply module, etc.) associated with the multicore processor 120 can be configured to provide power supply channels to the cores 110. The power supply channels may also be referred to as power rails. Power for each core, or group of cores, may be supplied by a separate power channel.

A power monitor 150 (e.g., a power monitor circuit, a power monitor module, etc.) associated with the multicore processor can be configured to monitor each of the power channels to determine the amount of power supplied from the power supply 130 to each of the cores 110. A power manager 160 (e.g., a power manager circuit, a power manager module, etc.) associated with the multicore processor 120 can be configured to cooperatively operate with the power supply 130 and the power monitor 150 to provide power management and thermal management for the multiprocessor 120.

According to some embodiments, the power manager 160 can be configured to control the power supply 130 in response to measurements from the power monitor 150. According to some other embodiments, the power manager 160 can be configured to control clock signals supplied to one or more of the cores 110 in response to measurements from the power monitor module 150. According to yet some other embodiments, the power manager 160 can be configured to provide an interface to the cores 110 or other components of the multicore processor 120 or associated computing device. The provided interface may be adapted to read status information related to the power manager 160, such as power channel measurements obtained from the power monitor 150. The interface may also be adapted to write to the power manager 160 to set configurations, controls or other variables associated with one or more of the power manager 160, the power monitor 150, and/or the power supply 130.

One example of dynamic thermal management that may be employed by the power manager 160 can be referred to as clock gating. Global clock gating can be adapted to turn off all, or substantially all, clock signals to halt processor operation of multicore processor 120. Local clock gating can be adapted to turn off individual clock signals to cores 110 or other blocks of the multicore processor 120. The gating off of clocks can temporarily reduce power consumption and may be used when there is an over-temperature condition or when an over-temperature condition is being avoided. While clocks are gated off, processor states such as registers, branch predictor tables, and local caches may be maintained. As such, clock gating can act as a suspend, or sleep, mode for processor cores 110 within the multicore processor 120 rather than an off-switch.

In addition to gating clock signals to temporarily stop one or more of the cores 110, the power manager 160 may also be configured to adjust the clock frequency (e.g., decrease the frequency to slow operational speed, or increase the frequency to increase operational speed) supplied to one or more of the cores 110. Alternatively, the clock may be run at a constant speed during the on-state of a duty cycle and gated off during the off-state of the duty cycle. As such, a clock duty cycle may adjusted by the power manager 160 to provide a periodic gating of the clock to reduce power consumption at the corresponding core 110. In addition to clock frequency and duty cycle, additional characteristics of the clock signal can be adjusted such as signal amplitude (either single ended or differential), voltage or current level, pulse width, period, etc. Adjusting of one or more characteristics associated with clock signals may be controlled by the power manager 160 such that the power consumption associated with each of the individual cores 110 within the multicore processor 120 may be controlled.

By providing a status and control interface, the power manager 160 may also be arranged to support higher level power management techniques. For example, policy-based thread migration techniques can be configured to relocate processes or threads between the cores 110 to manage power consumption and thermal characteristics of multicore processor 120. These higher level power management techniques may also be combined with physical approaches such as DVFS. Empirical tests can demonstrate that a multicore processor 120 having two cores 110 using thread relocation management along with basic voltage and frequency management can, in some examples, yield approximately 250% improvement in available resources or in equivalent reduction in power consumption.

According to another higher level, or hybrid, power management approach, a compiler or runtime environment may be configured to set optimization parameters used to compile or execute code according to the power management condition of a processor or core 110. The compiler can also be configured to suggest DVFS settings for the processor or core 110 according to computational needs.

It should be appreciated that the power channel monitoring techniques presented herein may be applied not only to processor cores 110, but also to any other blocks or functional units within the multicore processor 120. For example, memories, caches, input/output drivers, controllers, other blocks, or other functional units within the multicore processor 120 may be supported by the power channel monitoring techniques presented herein. Furthermore, the techniques may be applied to any blocks, cores, modules, circuits or other subdivisions within any integrated circuit, chip, system on chip (SOC), multichip array, application specific integrated circuits (ASICs), field programmable gate arrays (FPGAs), other programmable logic, memories, controllers, or so forth where such subdivisions may have individual, or partially isolated, power supply channels.

It should be appreciated that functions of the power monitor 150 and the power manager 160 may be provided within other modules. For example, such functionality may be integrated into the power supply 130 or other control, management, or supervisor modules. Similarly, the functions of the power monitor 150 and the power manager 160 may be combined into a single module.

Figure 2:
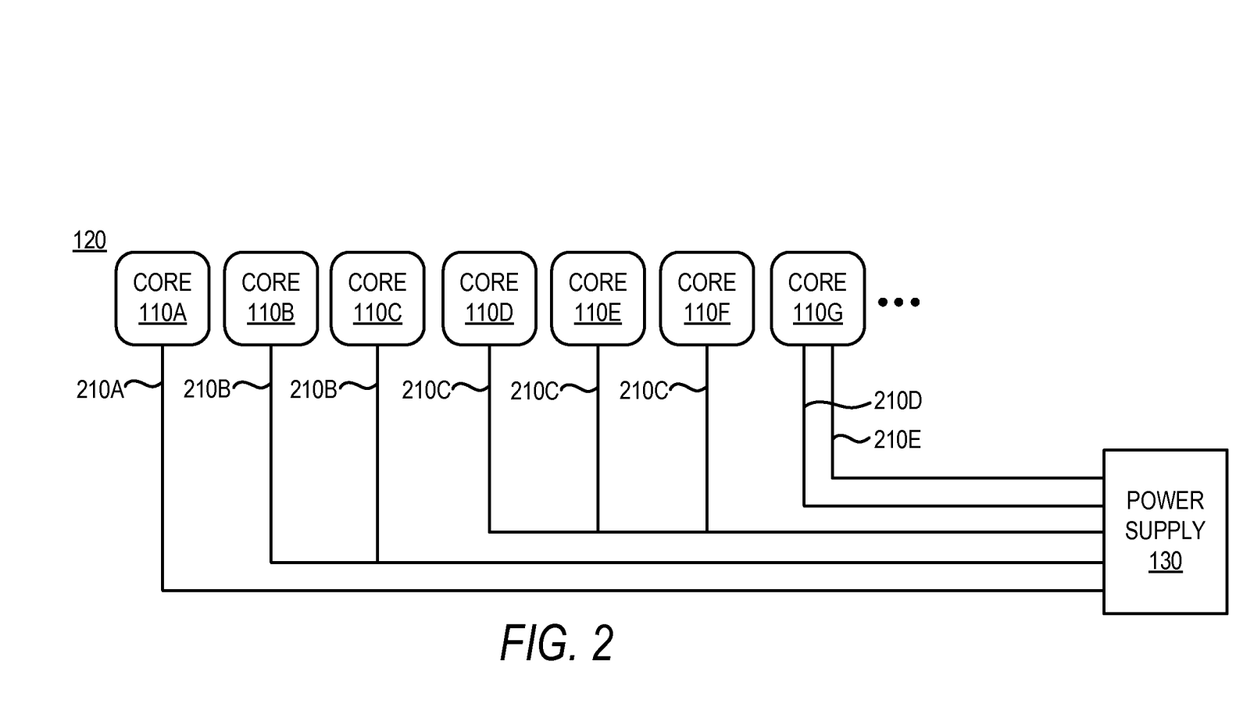
FIG. 2 is a schematic diagram illustrating a multicore processor with various power distribution architectures.

Turning now to FIG. 2, a schematic diagram illustrates a multicore processor 120 with various power distribution architectures arranged according to one or more embodiments presented herein. The power supply 130 can be configured to supply power to the cores 110 of the multicore processor. Power for each core, or group of cores, may be supplied by a separate power channel. For example, power channel 210A may supply power from the power supply 130 to the processor core 110A while power channel 210B may supply power from the power supply 130 to both of the processor cores 110B and 110C. Similarly, power channel 210C may supply power from the power supply 130 to the three processor cores 110D, 110E, and 110F. According to some embodiments, power may be supplied to each core, or group of cores, with two or more power channels. For example, the power channel 210D may be configured to supply power at 5 VDC (volts direct current) to the processor core 110G while a second power channel may be configured to supply power at 3.3 VDC to the same processor core 110G. Various other levels of power supply voltage or current may also be supported according to various embodiments.

Figure 3:
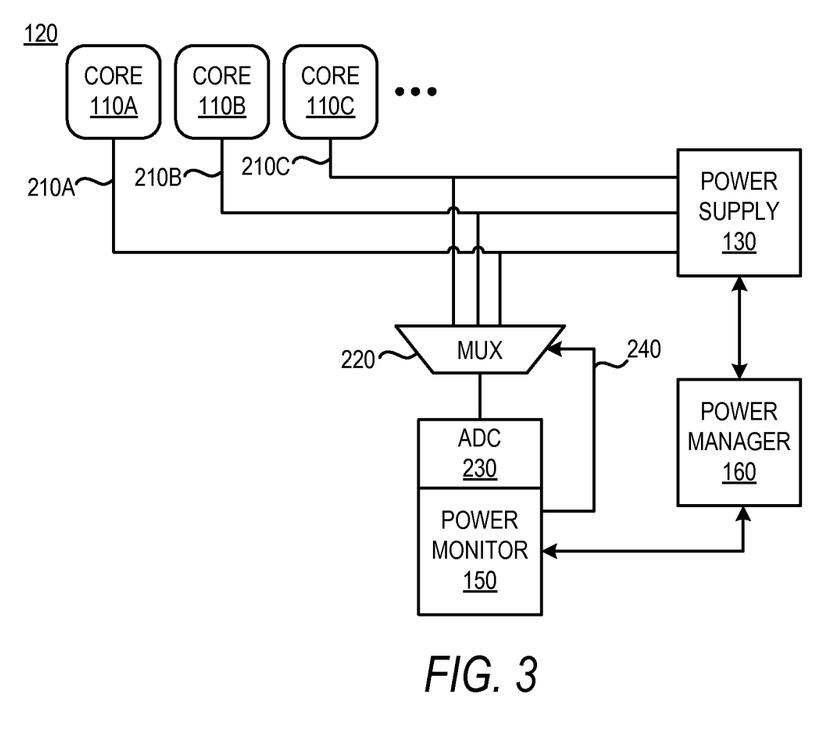
FIG. 3 is a schematic diagram illustrating a multicore processor having a multiplexed power monitor.

Turning now to FIG. 3, a schematic diagram illustrates a multicore processor 120 having a multiplexed power monitor arranged according to one or more embodiments presented herein. The power supply 130 can be configured to supply power to the cores 110 of the multicore processor. In this example, power can be supplied to core 110A over power channel 210A, to core 110B over power channel 210B, and to core 110C over power channel 210C. The power channels 210A-210C may be referred to collectively, or in general, as power channels 210. While three cores 110 are illustrated along with three power channels 210, it should be appreciated that any number of cores 110 and power channels 210 may be present within the multicore processor. The number of cores 110 and power channels 210 may be the same, or the number may differ as more than one core 110 may be supplied by a single power channel 210 and a core 110 may be supplied by more than one power channel 210.

The power delivered over each of the power channels 210 may be measured by the power monitor 150. According to some embodiments, an analog-to-digital converter (ADC) 230 may be adapted to measure the analog state of a power channel 210 and provide digital information that corresponds to the measured analog state. In one example, the ADC 230 may be configured to directly, or indirectly, measure the voltage of a power channel 210. In another example, the ADC 230 may be configured to measure the current of a power channel 210 as further detailed with respect to FIG. 4.

A multiplexer 220 may be configured to select which, of several, power channels 210 is currently being sampled by the ADC 230. One or more control inputs 240 associated with the multiplexer 220 may be used to select the current power channel 210 for monitoring. The control inputs 240 may be provided by the power monitor 150, the power manager 160, a counter, a state machine, or other circuit or module associated with the power management of the multicore processor 120. It should be appreciated that the multiplexer 220 and/or the ADC 230 may be integrated into the power monitor 150 according to embodiments.

The current and/or voltage associated with the power channels 210 may be measured by the power monitor 150. According to various embodiments, the voltage may be substantially fixed while the current may vary according to the power demand of the core 110. Alternatively, the current may be substantially fixed while the voltage varies according to the power demand of the core 110. Depending upon which of the current or voltage are varying, the power monitor 150 can measure the varying current and/or the varying voltage. The substantially fixed current or voltage can be a known, or specified, value. The power may then be computed according to the relationship that power equals current multiplied by voltage. For example, power (in Watts) may be determined by multiplying the current (in Amperes) by the voltage (in Volts). Voltage may also be referred to as potential, electrical potential, potential difference, or electromotive force. Current may be viewed as a time rate of charge flow. Also, power may be considered a capacity for doing work in a given period of time, where work may be viewed as applying a force over a distance, such as when moving a charge against a field.

The current and/or voltage of the power channels 210 may be measured by the power monitor 150 without substantial modification of the power delivery system within the multicore processor 120. As discussed above, direct measurement of the power supplied to cores 110 and other blocks of the multicore processor 120 can provide information about a computational load, or a usage level, associated with each core 110 without loading any data buses with message queries.

Measuring the power consumption of the cores 110 with the power monitor 150 may inform thermal modeling, thermal load balancing, load planning, and other system management functions related to power and thermal management. According to some embodiments, the power manager 160 may use the power consumption information associated with the processor cores 110 to adjust settings for the supplied voltages or clock frequencies of the associated cores 110. For example, if a particular processor core 110 is consuming a reduced amount of power, the power manager 160 may determine that the core 110 is handing a reduced computation load and thus lower the voltage supplied to that core 110, or reduce the clock frequency supplied to that core 110.

Figure 4:
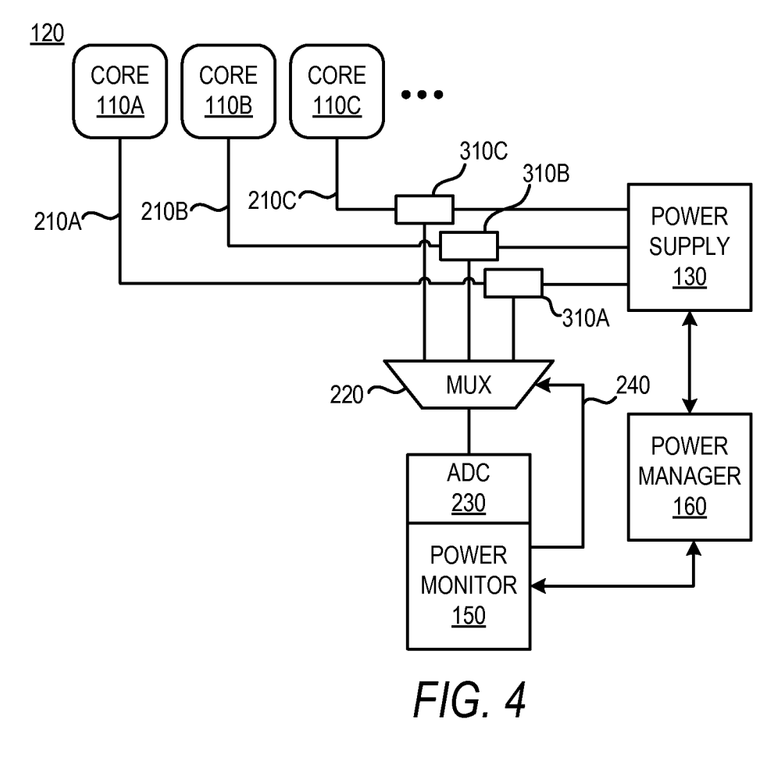
FIG. 4 is a schematic diagram illustrating a multicore processor having a multiplexed power monitor using current sensors.

In FIG. 4, a schematic diagram illustrates a multicore processor 120 having a multiplexed power monitor using current sensors 310A-310C arranged according to one or more embodiments presented herein. A current sensor 310A may be placed inline with power channel 210A supplying power to core 110A. Similarly, current sensor 310B may be placed inline with power channel 210B supplying power to core 110B and current sensor 310C may be placed inline with power channel 210C supplying power to core 110C. The current sensors 310A-310C may be referred to collectively, or in general, as current sensors 310. According to some embodiments, the power monitor 150 may be configured to measure a current associated with the supply channels 210. These current measurements may be performed using current sensors 310. A signal representative of the measured current may be a voltage (as discussed below) or a current and may be converted into a digital, or numerical, value using ADC 230.

An example current sensor 310 may involve measuring a drop in potential, or voltage, over a known load (or resistance) that is placed inline with the power channel 210 for which current being measured. However, it may be undesirable, from a thermal and power loss perspective, to drop an entire supply current through a known load. Thus, a scaled current mirror may be used as a current sensor 310 where a scaled representation of the current in the supply channel 210 may be provided by the current mirror for measurement. Alternatively, a feedback voltage signal within the current mirror may be measured directly. A current mirror can be any circuit designed to copy a current supplied through one component of the circuit by adjusting a current within another component of the circuit.

Figure 5:
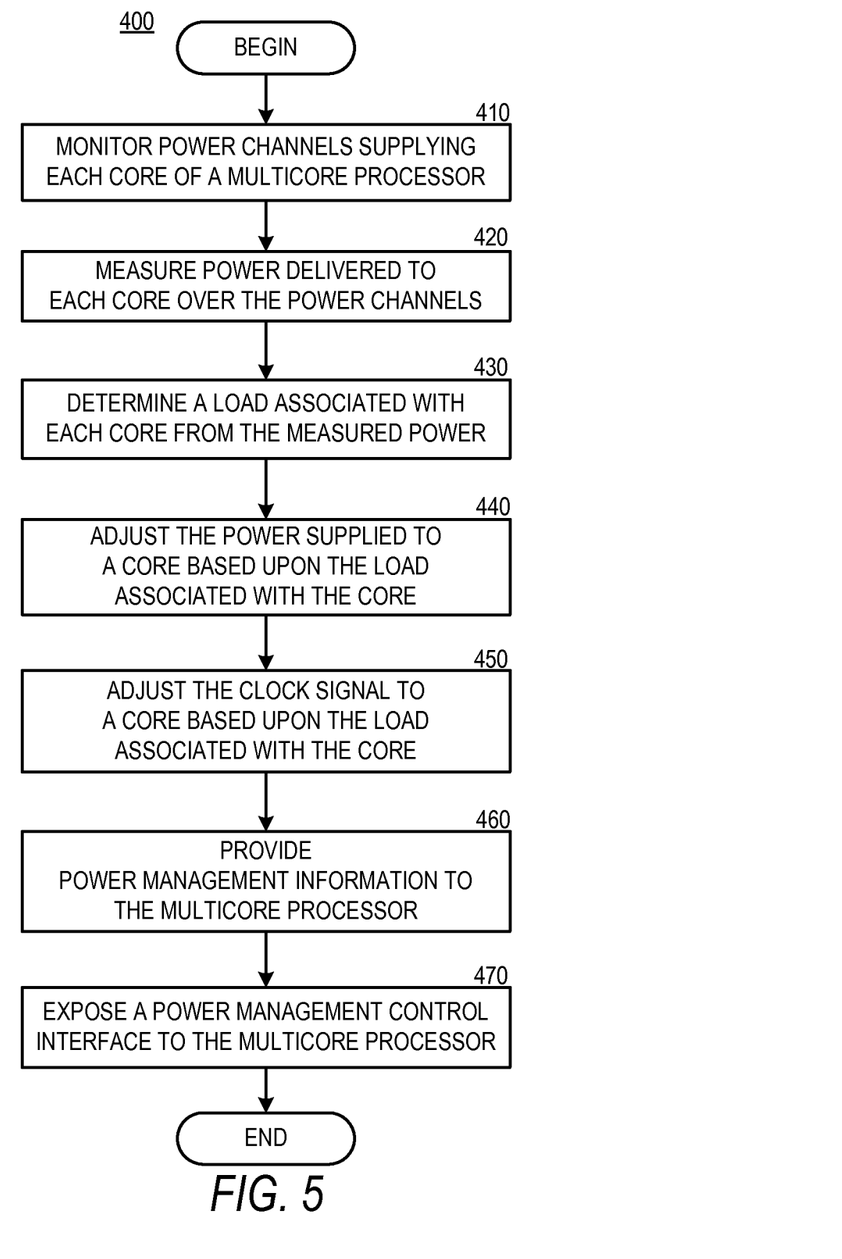
FIG. 5 is a flow diagram illustrating a process for power channel monitoring in a multicore processor.

Referring now to FIG. 5, additional details will be provided regarding the embodiments presented herein for power channel monitoring of core usage within a multicore processor. In particular, FIG. 5 is a flow diagram illustrating a process 400 for power channel monitoring in a multicore processor arranged according to at least some embodiments presented herein.

It should be appreciated that the operations described herein are implemented as a sequence of operational or manufacturing acts, as a sequence of computer implemented acts or program modules running on a computing system, or as interconnected machine logic circuits or circuit modules within the computing system. The implementation is a matter of choice dependent on the performance and other requirements of the various embodiments. Some of the logical operations described herein are referred to variously as state operations, functions, actions, structural devices, or modules. These operations, functions, actions, structural devices, and/or modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

Process 400 may include various operations, functions or actions as illustrated by one or more of blocks 410, 420, 430,

440, 450, 460, and/or 470. The process 400 may begin at block 410 (Monitor Power Channels Supplying Each Core of a Multicore Processor), where the power monitor 150 can be configured to measure the current and/or voltage on each of the respective power channels 210 supplying the processor cores 110. In some examples, the current and/or voltage on multiple power channels 210 may be measured using an ADC 230 and a multiplexer for 220 adapted to select which of the power channels 210 is currently being sampled by the ADC 230 for reading by the power monitor 150. Block 410 may be followed by block 420.

At block 420 (Measure Power Delivered to Each Core over the Power Channels), the power monitor 150 may be configured to determine the power supplied by each of the respective power channels 210 to the processor cores 110. The current or voltage of each respective power channel 210, as measured at block 410, may be used to determine the power consumed by the core 110 associated with each power channel 110. As discussed above, a measured current and/or voltage may be used to compute the power consumed using the relationship of power equals current multiplied by voltage. Block 420 may be followed by block 430.

At block 430 (Determine a Load Associated with Each Core from the Measured Power), the power manager 160 and/or the power monitor 150 may be configured to determine a computational load associated with each of the cores 110 of the multicore processor 120. The computation load being serviced by a core 110 may be determined from the power being consumed by the core 110 as determined at block 420. The power consumed by a core 110 may largely be used by switching transistors within the logic, gates, registers, and other memories associated with the core 110. The power consumption may be highly correlated to the activity of these elements within the core 110 and thus may be used as a proxy for determining the load being serviced by the core 110. A measure of the computational load may also be referred to as an activity level associated with each core 110. Block 430 may be followed by block 440.

At block 440 (Adjust the Power Supplied to a Core Based upon the Load Associated with the Core), the power manager 160 may be configured to adjust the power being supplied from the power supply 130 to each of the cores 110 within the multicore processor 120. The power delivered to a core 110 may be adjusted by scaling the voltage and/or current driven to the power channel 210 feeding the core 110 by the power supply 130. Block 440 may be followed by block 450.

At block 450 (Adjust the Clock Signal to a Core Based upon the Load Associated with the Core), the power manager 160 may be configured to adjust the respective clocks being supplied to each of the core 110 within the multicore processor 120. The power consumed by a core 110 may be adjusted by gating, scaling, or duty cycling the clock signal used by the core 110. Furthermore, the clock signal may be adjusted according to its amplitude (either single ended or differential), voltage or current level, frequency, voltage, pulse width, or period. Block 450 may be followed by block 460.

At block 460 (Provide Power Management Information to the Multicore Processor), the power manager 160 may be configured to provide information related to power management to the multicore processor 120. The information may include the voltage and/or current supplied to each core 110 as measured at block 410, the power supplied to each core 110 as determined at block 420, the load at each block as determined at block 430, or any other power management information that may be used to control, measure, or manage operation of the multicore processor 120. The information may be supplied by the power manager 160 in the form of readable data registers. The interface for reading the registers may be internal to the multicore processor 120 or may be supplied as input/output on any data buses, low pin count buses, or other interfaces to the power manager 160. Block 460 may be followed by block 470.

At block 470 (Expose a Power Management Control Interface to the Multicore Processor), the power manager 160 may be configured to provide an interface for controlling parameters related to power management on the multicore processor 120. The parameters may include specifying the voltage and/or current supplied to each core 110, the power and clock adjustments to be made in response to the measured load at each core 110 as determined at block 430, or any other power management parameters used to control, measure, and/or manage operation of the multicore processor 120. The interface may be provided within the power manager 160 in the form of writable data registers. The interface for writing to the registers may be internal to the multicore processor 120 or may be supplied as input/output on any data buses, low pin count buses, or other interfaces to the power manager 160. After block 470, the process 400 may either repeat (e.g., periodically, continuously, or on demand as needed) or terminate.

Figure 6:
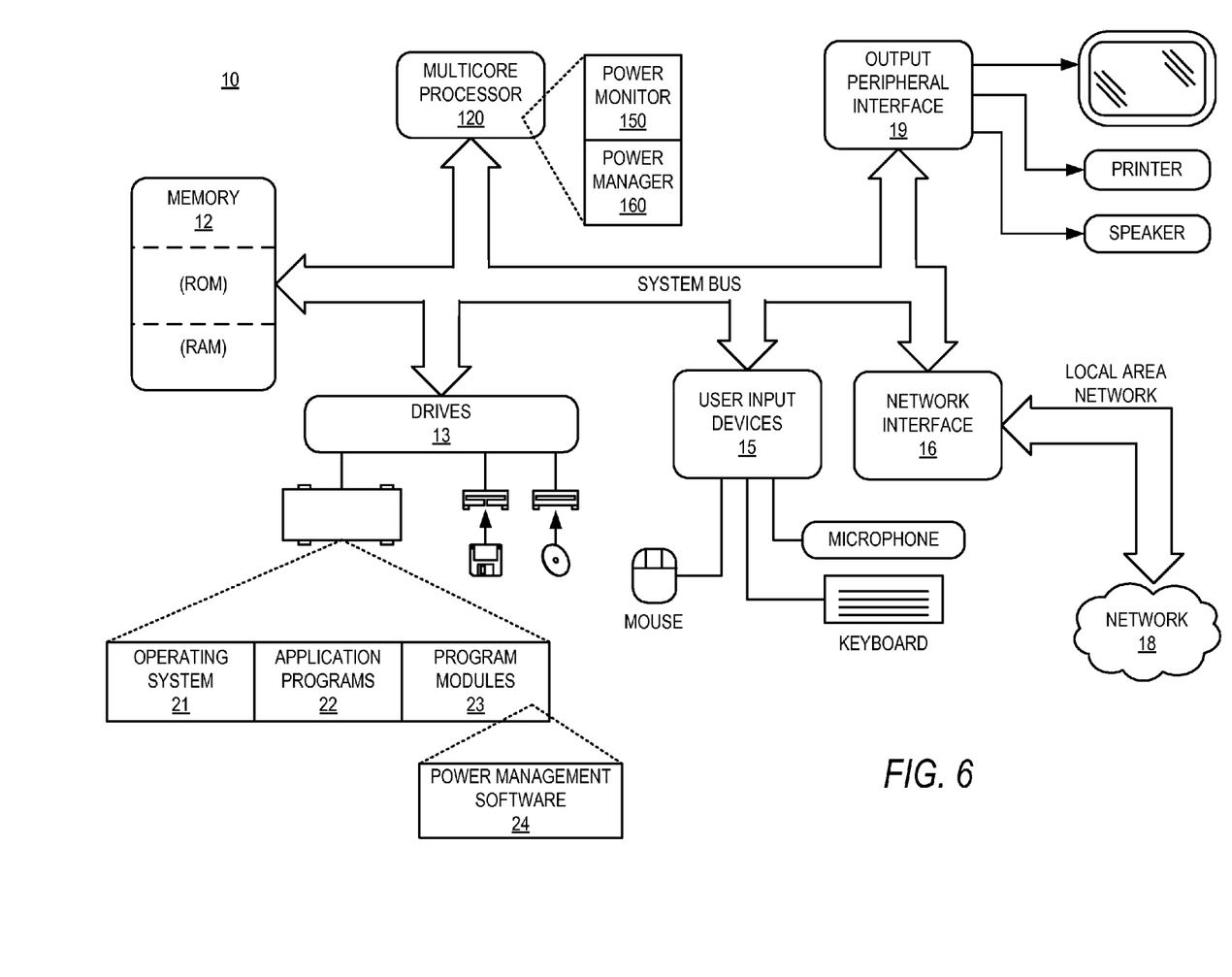
FIG. 6 is a block diagram illustrating an example computing system, all arranged according to at least some embodiments presented herein.

With reference to FIG. 6, an example computing system is illustrated for implementing various embodiments described herein. The computing system can support embodiments for implementing power channel monitoring for multicore processors. For example, the computing system illustrated in FIG. 6 might include a multicore processor 120 configured to support power channel monitoring. Various embodiments may include computers, dedicated hardware, or embedded computing systems.

The computing system includes a computer 10. The computer 10 can include the multicore processor 120, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, a laptop, or a server computer, a mobile device, a set-top box, a kiosk, a vehicular information system, a mobile telephone, a customized machine, or other hardware platform. According to various embodiments, the multicore processor 120 may be a general purpose processor, a processor core, a multiprocessor, a multicore processing unit, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof. The multicore processor 120 may feature a power monitor 150 and/or a power manager 160 as discussed herein.

The drives 13, other storage devices, or their associated computer-readable storage media may store an operating system 21, application programs 22, and program modules 23. The program modules 23 may include power management software 24 for implementing power monitoring and power management functionality as discussed herein. It should be appreciated that the power management software 24 may also be part of the operating system 21, the application programs 22, the ROM, or any other component for providing executable instructions to the computer 10. The computer 10 may include user input devices 15 through which a user may enter commands and data. Input devices may include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices may be connected to the multicore processor 120 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer may include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 may include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

The computer 10 may include one or more instances of a physical computer-readable storage medium or media associated with drives 13 or other storage devices. The system bus may enable the multicore processor 120 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules. The program modules 23 may include software instructions that, when loaded into the multicore processor 120 and executed, transform a general-purpose computing system into a special-purpose computing system customized to facilitate all, or part of, the power monitoring and power management techniques disclosed herein. As detailed throughout this description, the program modules 23 may provide various tools or techniques by which the computer 10 may participate within the overall systems or operating environments using the components, logic flows, and/or data structures discussed herein.

According to some embodiments, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. An integrated circuit adapted to monitor power supply channels within a multicore processor that includes a plurality of processor cores, the integrated circuit comprising:
   a plurality of processor cores;
   a plurality of power supply channels configured to supply power to each of the plurality of processor cores;
   a power monitor configured to measure power supplied over each of the power supply channels to each of the plurality of processor cores via analog-based inline current sensors in each of the power supply channels;
   a multiplexer configured to select at least one of the plurality of power supply channels and corresponding inline current sensor for measurement by the power monitor; and
   a power manager configured to adjust an operational parameter of one or more of the plurality of processor cores based upon the measured power,
   wherein the power monitor and the power manager are external to the plurality of processor cores.

2. The integrated circuit of claim 1, wherein one of the plurality of power supply channels is configured to supply power to two or more of the plurality of processor cores.

3. The integrated circuit of claim 1, wherein two or more of the plurality of power supply channels is configured to supply power to a same one of the plurality of processor cores.

4. The integrated circuit of claim 1, wherein the operational parameter comprises one or more characteristics of a clock signal that is provided to the one or more of the plurality of processor cores, wherein the one or more characteristics of the clock signal comprises one or more of a frequency or a voltage.

5. The integrated circuit of claim 1, wherein the operational parameter comprises one or more characteristics of a clock signal that is provided to the one or more of the plurality of processor cores, wherein the one or more characteristics of the clock signal comprises one or more of a period, pulse width, a duty cycle, a signal amplitude, and/or a current.

6. The integrated circuit of claim 1, wherein the power monitor comprises an analog-to-digital converter (ADC) that is coupled to one or more of the plurality of power supply channels, wherein the ADC is configured to receive a measurement of an analog state of at least one of the power supply channels and to transform the analog state into digital information regarding the power supplied over the at least one of the power supply channels.

7. The integrated circuit of claim 1, wherein the power monitor is coupled to one or more of a voltage sensor and/or one or more of a current sensor that is placed inline with one or more of the plurality of power supply channels, wherein the voltage sensor and/or the current sensor is configured to provide an analog state regarding the one or more of the plurality of channels to the power monitor.

8. The integrated circuit of claim 1, wherein the analog-based inline current sensors include at least one current sensor that is coupled in series with one or more of the plurality of power supply channels, wherein the at least one current sensor comprises one or more current mirrors, wherein the at least one current sensor is configured to measure a drop in potential over a known load and to provide the measured drop in potential to the power monitor.

9. The integrated circuit of claim 1, wherein the inline current sensors are configured to perform analog-based sensing of the power supplied over each of the channels without digital communication between the plurality of processor cores and the power monitor.

10. A method to monitor power supply channels within a multicore processor that includes a plurality of processor cores, the method comprising:
    selecting at least one of a plurality of power supply channels of the plurality of processor cores using a multiplexer;
    measuring power provided by the selected at least one of the plurality of power supply channels via analog-based inline current sensors in each of the plurality of power supply channels, wherein each of the plurality of power supply channels provides power to one or more of the plurality of processor cores;
    determining a power usage associated with each processor core based upon a result of monitoring each of the plurality of power supply channels; and
    adjusting an operational parameter of one or more of the plurality of processor cores based upon the determined power usage, wherein the measuring, the determining, and the adjusting are performed external to the plurality of processor cores.

11. The method of claim 10, wherein measuring the power comprises measuring one or more of a voltage level associated with one or more of the plurality of power supply channels, and/or a current level associated with one or more of the plurality of power supply channels.

12. The method of claim 10, wherein measuring the power comprises sampling one of plurality of power supply channels using an analog-to-digital converter (ADC).

13. The method of claim 10, further comprising determining an activity level associated with one or more of the processor cores based upon the determined power usage associated with the respective processor core.

14. The method of claim 10, wherein adjusting the operational parameter of the one or more of the plurality of processor cores comprises one or more of adjusting the power supplied to one or more of the processor cores in response to the determined power usage associated with the respective processor core, and/or adjusting a clock signal supplied to one or more of the processor cores in response to the determined power usage associated with the respective processor core.

15. The method of claim 10, further comprising providing the multicore processor with power management information associated with the determined power usage.

16. The method of claim 10, further comprising providing an interface to the multicore processor to configure power management operations associated with the plurality of processor cores.

17. A multicore processor including power supply channels adapted to monitor power supply, the multicore processor comprising:
 a plurality of processor cores;
 a plurality of power supply channels coupled to the plurality of processor cores, wherein each of the plurality of power supply channels is associated with one or more of the plurality of processor cores;
 a power monitor configured to measure power supplied over each of the plurality of power supply channels via analog-based inline current sensors in each of the power supply channels;
 a multiplexer configured to select at least one of the plurality of power supply channels and corresponding inline current sensors for measurement by the power monitor; and
 a power manager configured to determine activity levels associated with one or more of the plurality of processor cores based upon the measured power supplied over each of the plurality of power supply channels, and adjust power levels associated with one or more of the plurality of power supply channels in response to the determined activity levels associated with one or more of the plurality of processor cores, wherein the power monitor and the power manager are external to the plurality of processor cores.

18. The multicore processor of claim 17, wherein the power monitor comprises an analog-to-digital converter (ADC) that is coupled to one or more of the plurality of power supply channels.

19. The multicore processor of claim 17, wherein the power monitor comprises one or more of a voltage sensor and/or one or more of a current sensor that is coupled to one or more of the plurality of power supply channels.

* * * * *

UNITED STATES PATENT AND TRADEMARK OFFICE
CERTIFICATE OF CORRECTION

PATENT NO. : 8,892,931 B2  
APPLICATION NO. : 12/582301  
DATED : November 18, 2014  
INVENTOR(S) : Kruglick Page 1 of 1

It is certified that error appears in the above-identified patent and that said Letters Patent is hereby corrected as shown below:

In the Specification:

In Column 3, Line 15, delete "multiprocessor 120." and insert -- multicore processor 120. --, therefor.

In Column 7, Lines 18-19, delete "channel 110." and insert -- channel 210. --, therefor.

Signed and Sealed this  
Fifth Day of May, 2015

Michelle K. Lee  
*Director of the United States Patent and Trademark Office*